(12) United States Patent
Nellen et al.

(10) Patent No.: US 8,857,903 B2
(45) Date of Patent: Oct. 14, 2014

(54) ROOF SYSTEM FOR A VEHICLE

(75) Inventors: Marcel Johan Christiaan Nellen, Merselo (NL); Ruud Geurts, Helden (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/559,154

(22) Filed: Jul. 26, 2012

(65) Prior Publication Data
US 2013/0187412 A1   Jul. 25, 2013

(30) Foreign Application Priority Data

Aug. 2, 2011 (EP) .................................... 11176299

(51) Int. Cl.
*B60J 7/047* (2006.01)
*B60J 7/02* (2006.01)
*B60J 7/043* (2006.01)

(52) U.S. Cl.
CPC .. *B60J 7/047* (2013.01); *B60J 7/02* (2013.01); *B60J 7/0435* (2013.01); *B60J 7/024* (2013.01)
USPC ................................ 296/216.03; 296/220.01

(58) Field of Classification Search
USPC .................... 296/216.02–216.05, 221, 220.01
See application file for complete search history.

(56) References Cited

U.S. PATENT DOCUMENTS

| 7,828,376 | B2 | 11/2010 | Nellen |
| 7,878,581 | B2 * | 2/2011 | Faerber et al. ........... 296/216.03 |
| 2007/0114817 | A1 | 5/2007 | Becher |
| 2009/0179462 | A1 | 7/2009 | Nellen |

FOREIGN PATENT DOCUMENTS

| EP | 1741588 A1 | 1/2007 |
| EP | 1790515 A1 | 5/2007 |

OTHER PUBLICATIONS

Search Report of The Hague Patent Office in counterpart foreign application EP No. 11176299.3 filed Aug. 2, 2011.

* cited by examiner

*Primary Examiner* — Dennis H Pedder
(74) *Attorney, Agent, or Firm* — Steven M. Koehler; Westman, Champlin & Koehler, P.A.

(57) ABSTRACT

A roof system includes a closure that opens a roof opening in a vehicle. An operating mechanism for the closure includes a first device including a lever configured to move the rear edge of the closure towards a raised position above the roof. A second device includes a lever configured to move the front edge of the closure in a vertical direction. At least one of the levers has a first pivotal connection at a first end of the closure, and spaced second and third connections connecting the respective lever at least to a guiding slide. At least one of the levers is pivotally connected to a sliding member at one of said second and third connections. The sliding member is separate from the guiding slide, slides in the longitudinal direction of the guide rail and is supported by the guide rail in directions perpendicularly to the longitudinal sliding direction.

27 Claims, 14 Drawing Sheets

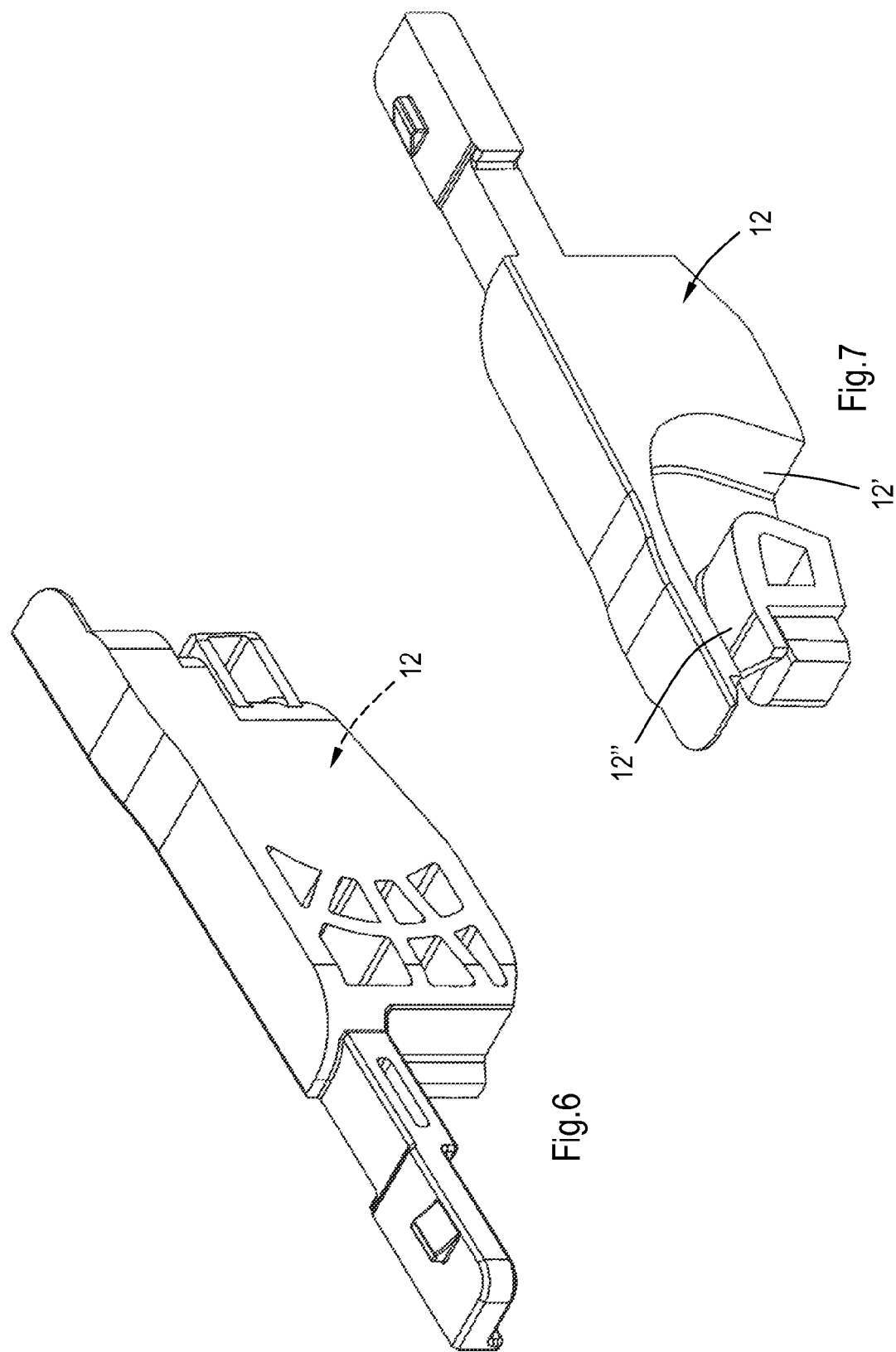

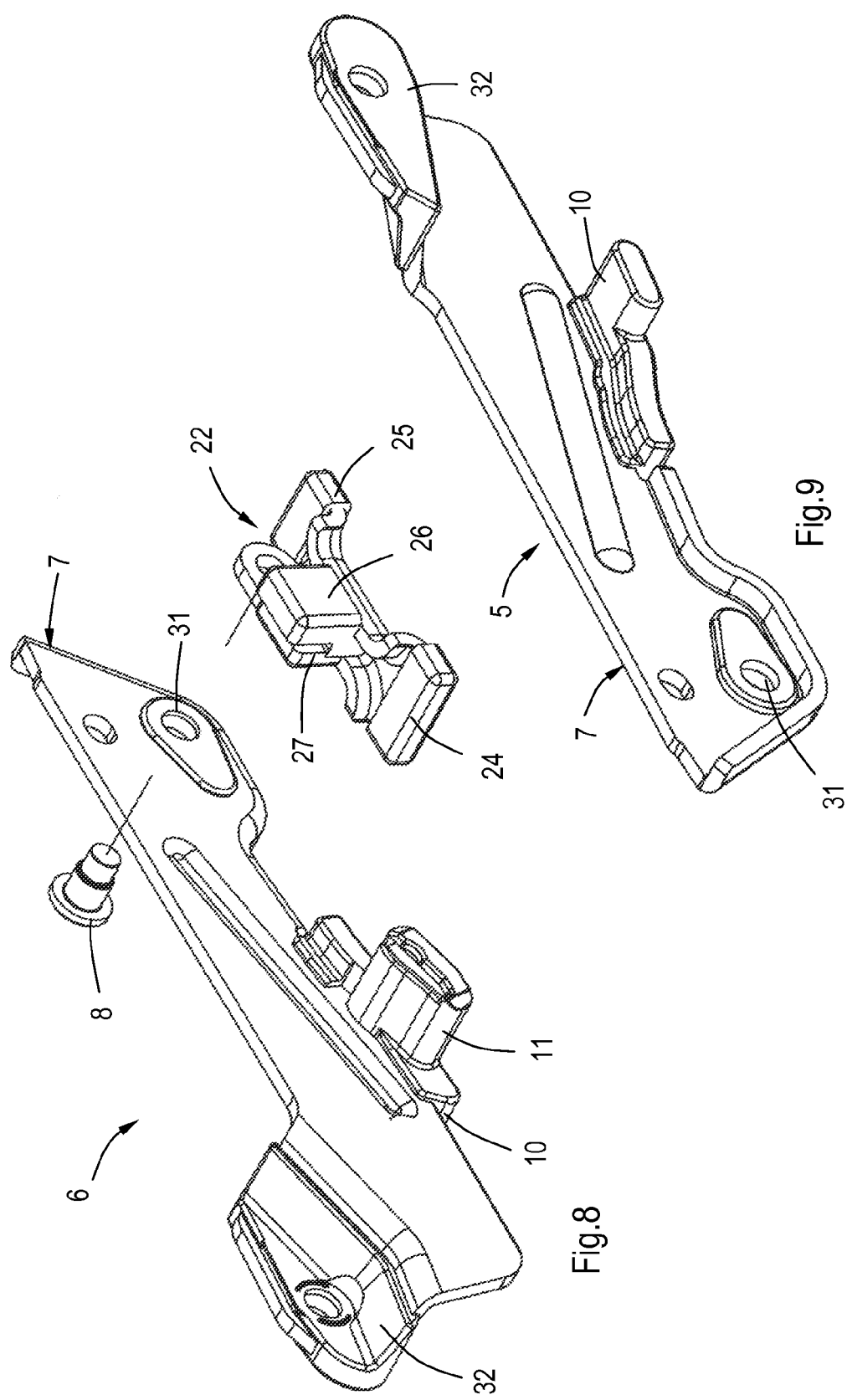

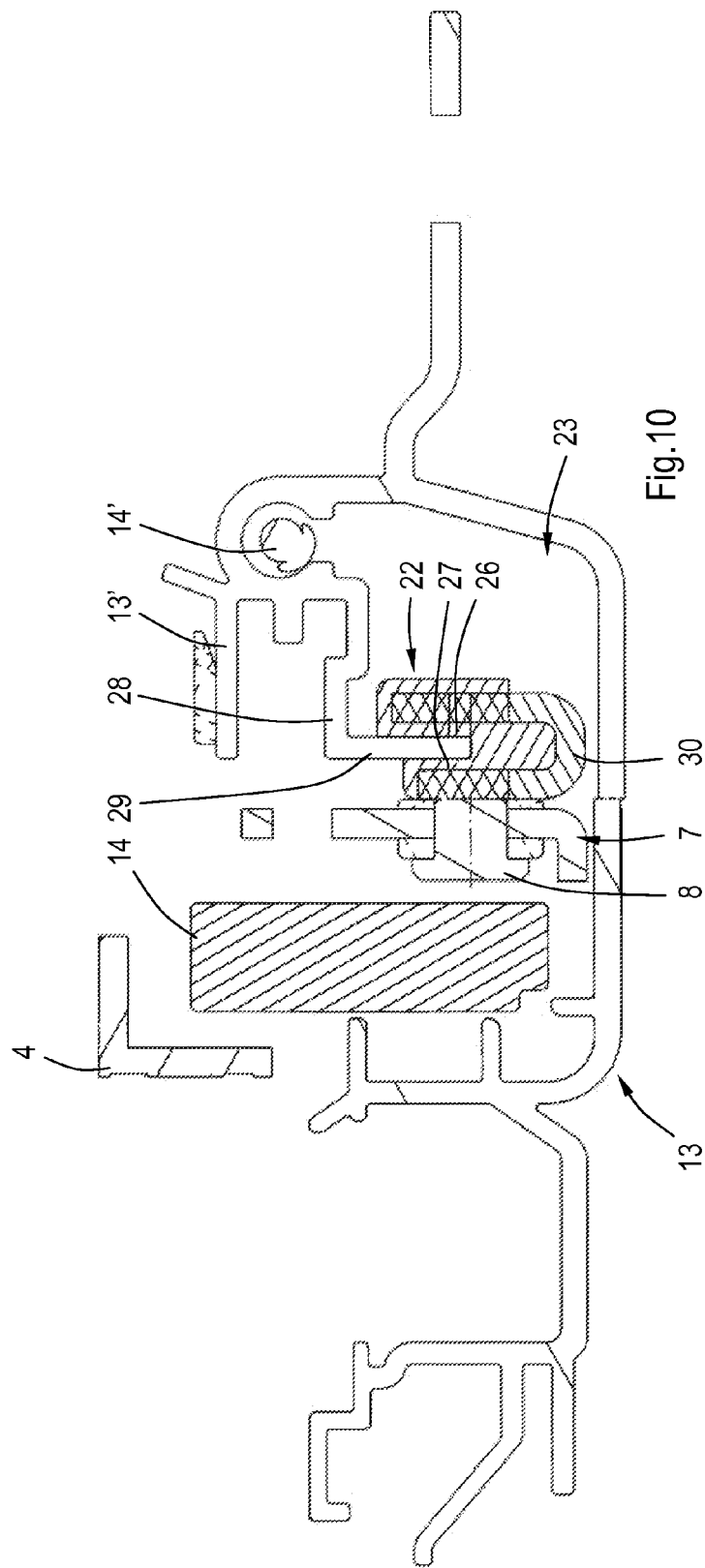

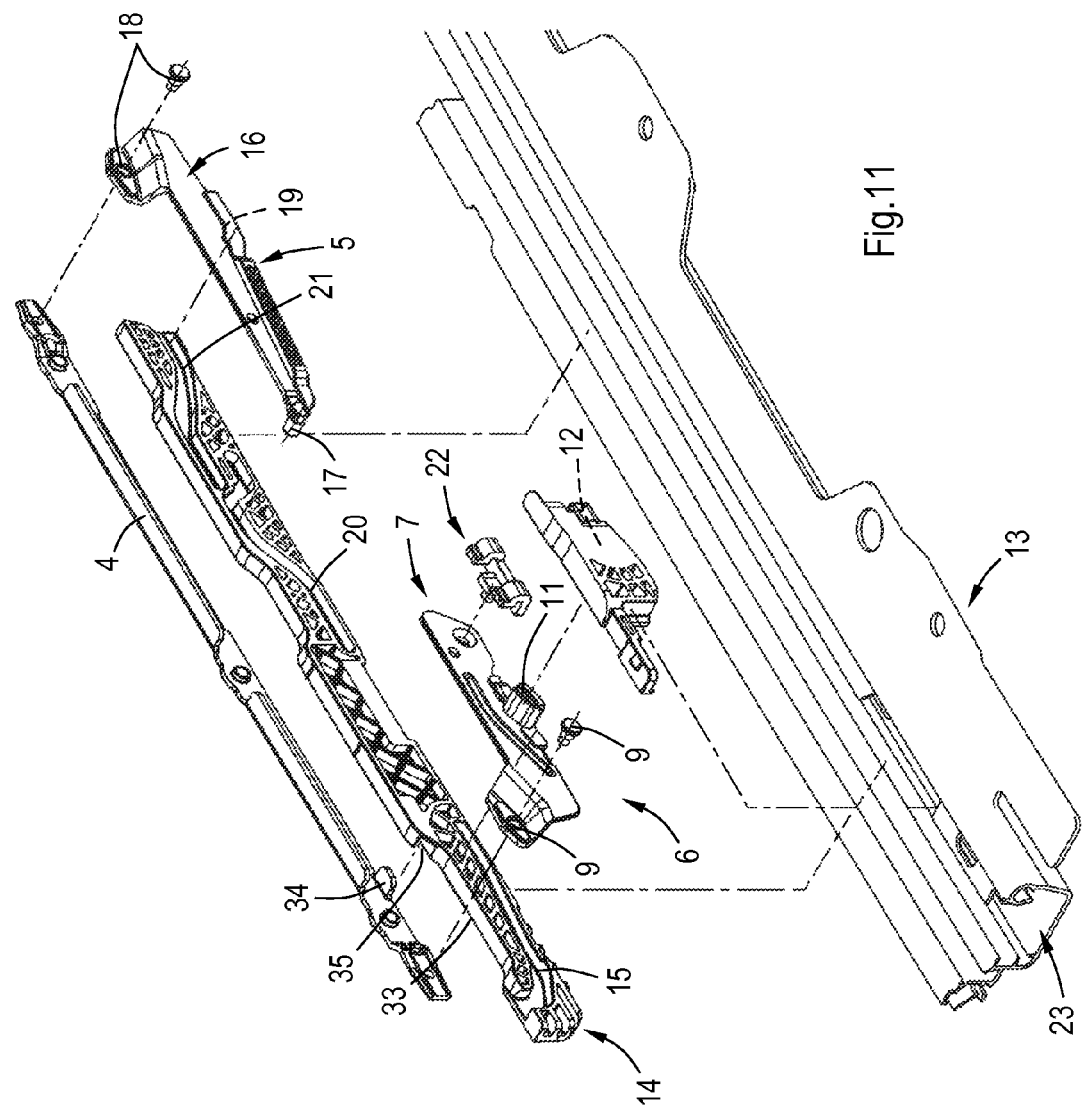

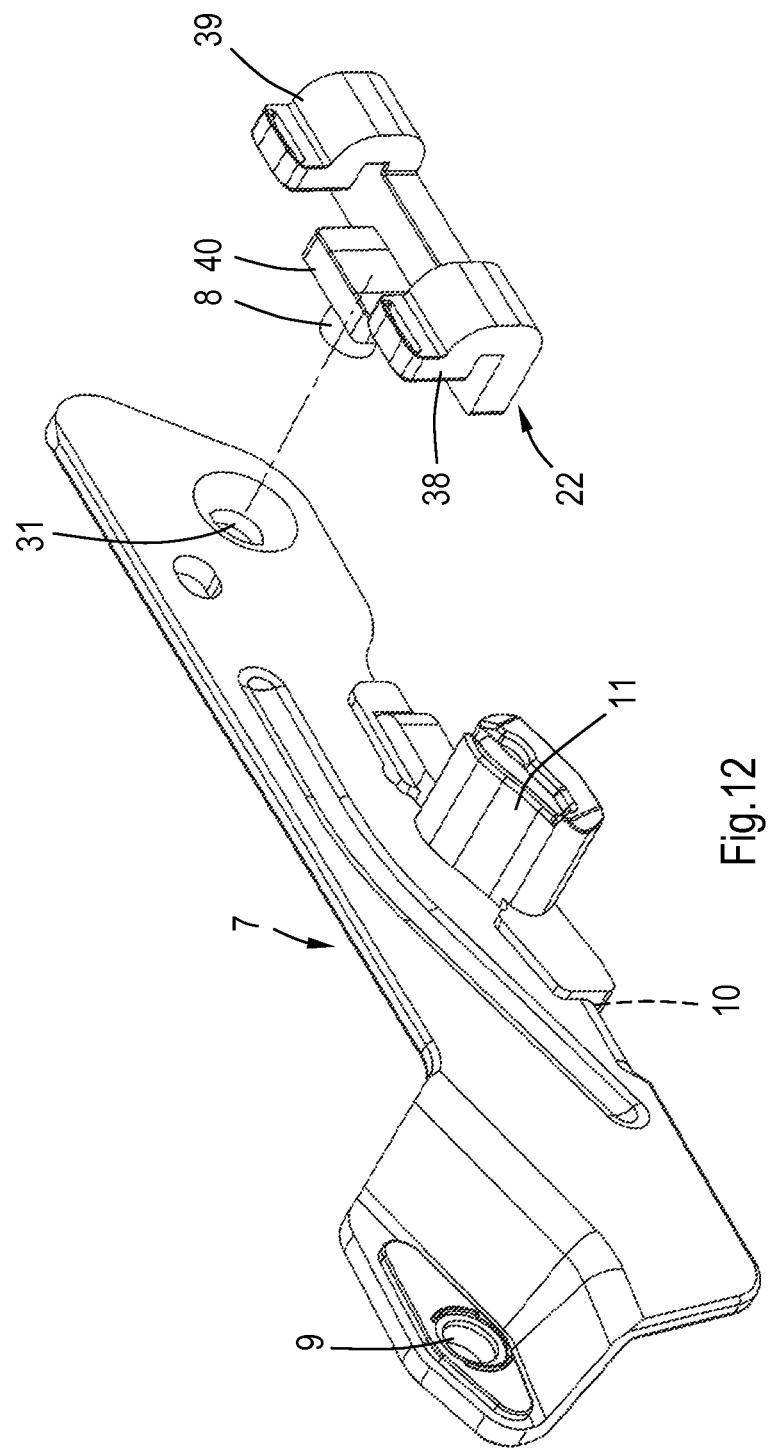

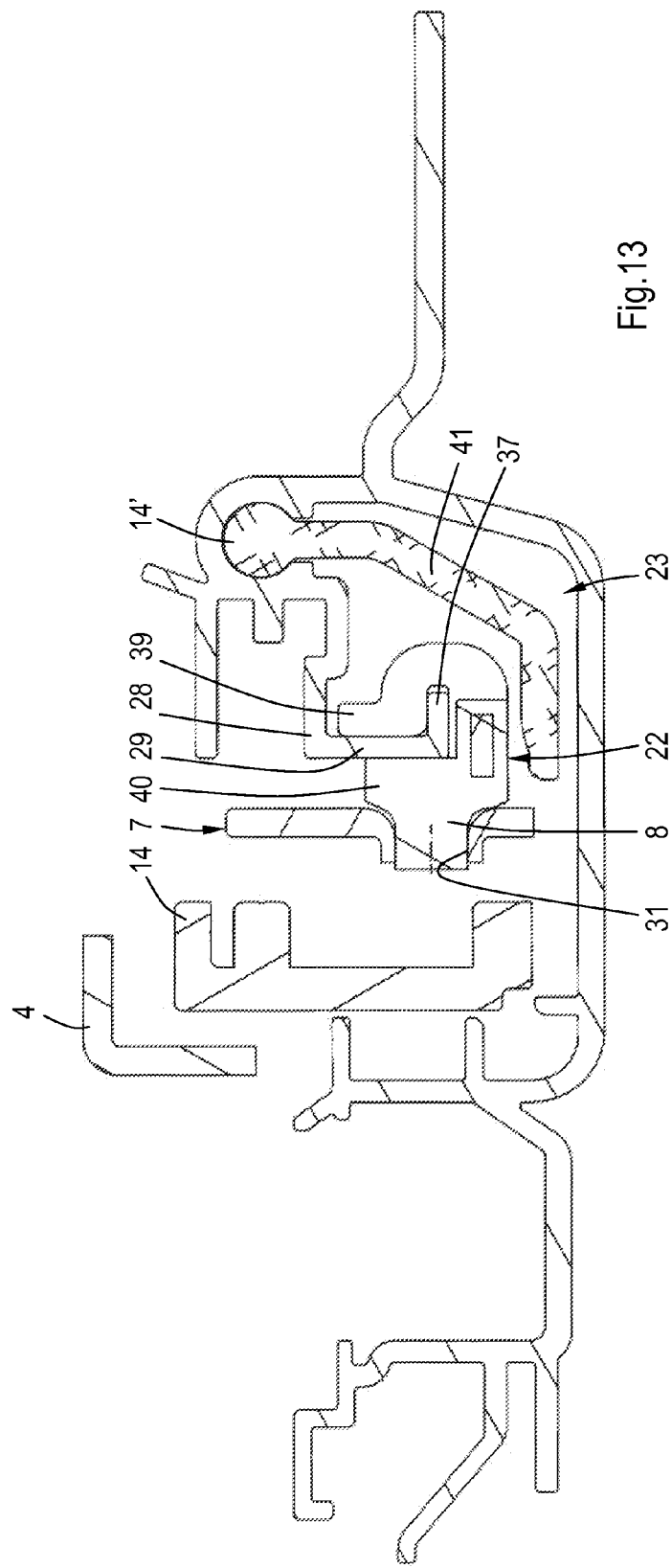

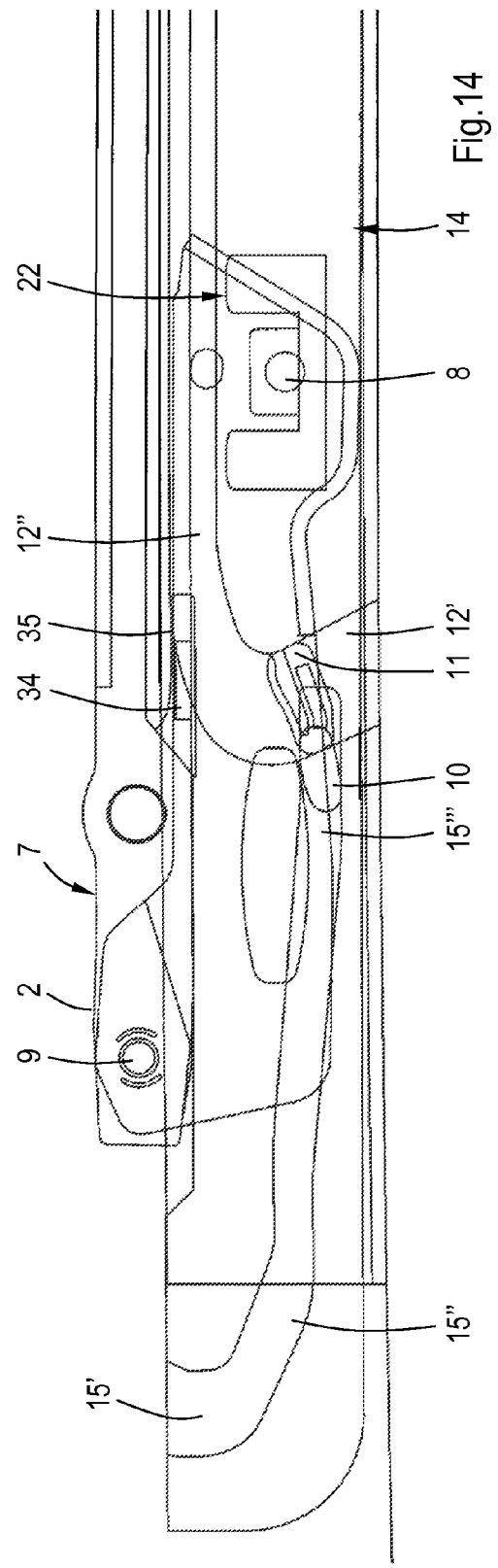

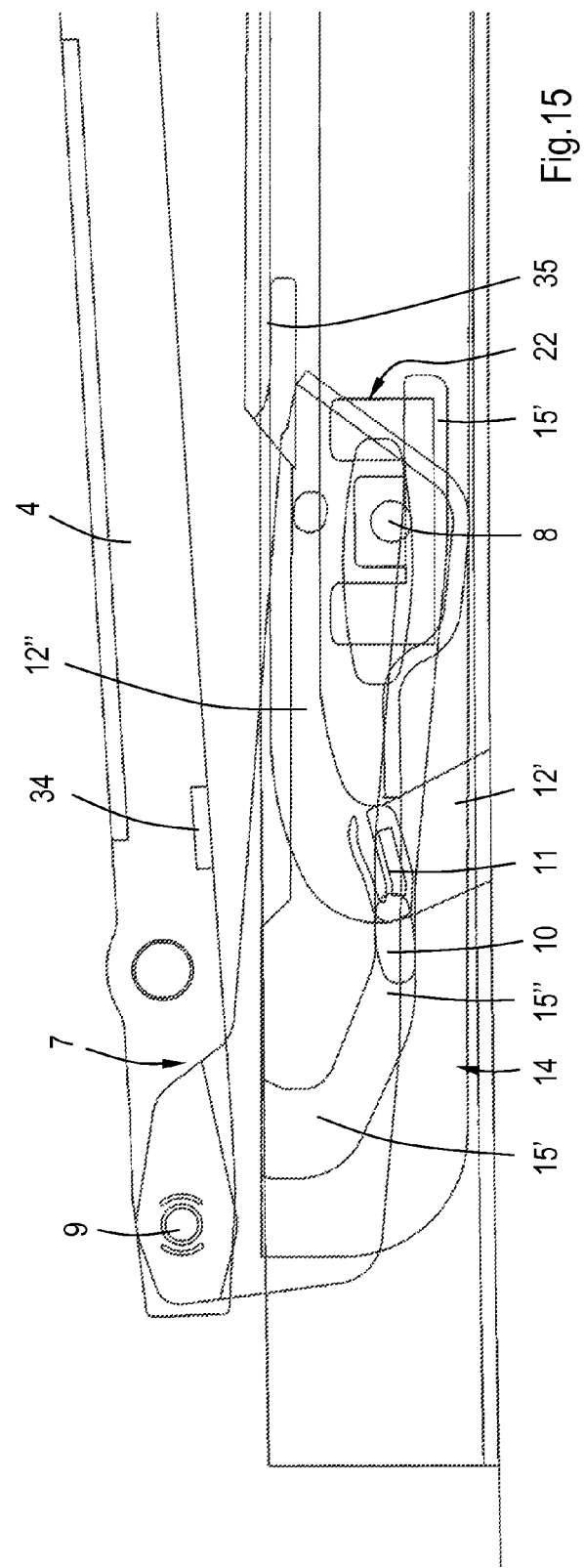

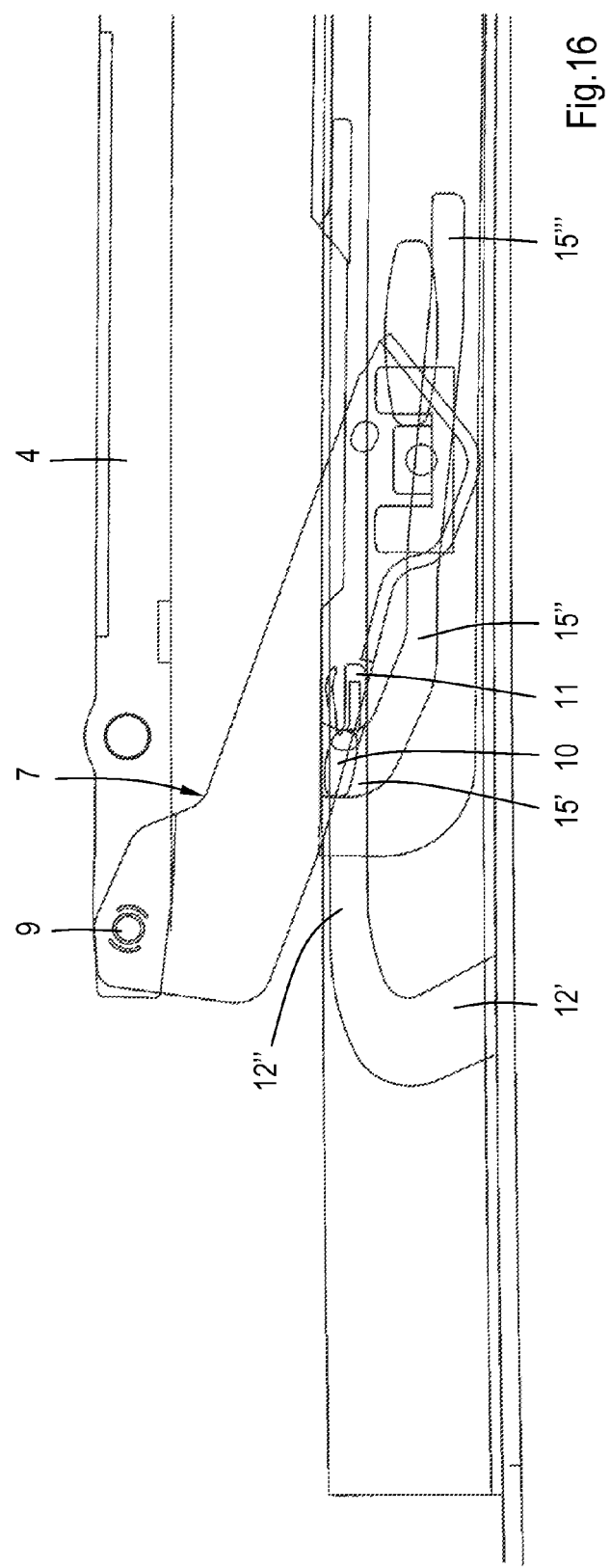

ROOF SYSTEM FOR A VEHICLE

BACKGROUND

The discussion below is merely provided for general background information and is not intended to be used as an aid in determining the scope of the claimed subject matter.

The invention relates to a roof system that opens and closes a roof opening in a vehicle. Generally, such roof systems include a closure element (hereinafter "closure") that is movable between a closed and open position in which it opens and closes the roof opening. Movement of the closure is effectuated by an operating mechanism. An improved operating mechanism in particular in relation to its stability under loads from the closure is often desired.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the invention comprises a roof system for a vehicle having a roof opening in a roof part. In one embodiment, the roof system includes a closure that is movable between a closed and open position in which it opens the roof opening and is positioned at least partially above an adjoining roof part. A stationary guide rail at each longitudinal side of the roof opening slidably guides an operating mechanism that operates the closure in a longitudinal direction of the vehicle. The operating mechanism comprises a first device including a lever configured to move the rear edge of the closure towards a raised position relative to the closed position and above the adjoining roof part. A second device includes a lever configured to move the front edge of the closure in a vertical direction. A guiding slide is slidably accommodated in each guide rail and is drivable by a drive member in order to move the closure both in vertical and in horizontal directions through the first and second devices. At least one of the levers has, at a first end, a first pivotal connection to the closure, and, remote from the first end, spaced second and third connections connecting the respective lever at least to the guiding slide. At least one of the levers is pivotally connected to a sliding member at one of said second and third connections. The sliding member is separate from the guiding slide, slides in the longitudinal direction of the stationary guide rail and is supported by the guide rail in directions perpendicularly to the longitudinal sliding direction.

Due to the use of a separate sliding member which has a pivotal connection to the respective lever and which is supported by the guide rail, unwanted vertical and lateral movements of the operating mechanism under loads (for example due to wind load or in the event of a crash) can be reduced. A pivotal connection is more stable than a pin-slot connection as a result of the larger contact surface, while the separate sliding member can be kept compact and guided by the guide rail close to the connection to the lever, thereby reducing movements due to bending.

In one embodiment the second connection is positioned near the second end of one of said levers and the third connection is positioned between said first and second connections, and the at least one of said levers may be connected to the sliding member at the second connection.

Although both levers, or even only the rear lever, may be connected to a respective sliding member, advantageous results come from the front lever being connected to said sliding member. Movements at the front side of the closure have a larger aero acoustical effect than at the rear side.

The sliding member may be guided in a guide channel of the guide rail, which is provided with a guide flange engaging the sliding member near the respective second or third connection. The guide flange may be provided with a horizontal portion engaged by the sliding member spaced from the sides and bottom of the sliding member. The guide flange may include a downwardly extending flange portion which is engaged by the sliding member, particularly from both sides, and which is spaced from the sides of the sliding member.

Due to any of these features, a very stable support and thus little movement under load of the pivotal connection to the lever is accomplished.

The sliding member, when seen in longitudinal direction of the guide rail, is supported in downward and in upward direction at spaced locations. The spacing will generally be shorter than at the guiding slide and the sliding member will have a rigid structure, thereby minimizing bending within the sliding member. The shape and dimension of the sliding member and its supporting locations, where for example slide shoes are provided, might depend on the shape of the guide rail. With relatively small radius of curvature, the spacing will be smaller than when the guide rail is almost straight. The dimensions of the slide shoes will normally be as large as possible to minimize the pressure on and consequently the deformation of the guide rail (and displacement of the closure support) in case of wind load.

The at least one of said levers might be connected to the guiding slide at the third connection, which includes a cam on the lever and a track in the guiding slide. This third connection and the track, which will normally be a curved slot, will determine the movements of the respective lever if the second connection is to the sliding member which will generally move parallel to the guide rail.

The track in the guiding slide may be a slot. This slot may be closed or may have a downwardly open slot portion which is open at its bottom for a longitudinal extent which is larger than the longitudinal dimension of the cam on the respective lever, wherein the guiding slide on its upper side comprises an auxiliary guide track engaged by the respective lever at least when the cam is in the open slot portion.

Due to the downwardly open slot portion, the package height of the operating system can be reduced, while stability is maintained by the engagement of the lever with the auxiliary guide track on the guiding slide.

The auxiliary guide track may include a ramp portion to lift the respective lever when the cam is transferred from the downwardly open slot portion to the downwardly closed slot portion. This will guarantee a smooth transfer of the cam between the open and closed slot portions.

The respective lever engages the auxiliary guide track on the guiding slide at a position near its first end. This further increases stability.

The pivotal connection between the at least one of said levers and the sliding member includes a pin and bearing, such as a bushing in which the pin is rotatably enclosed. This leads to a simple but stable support of the lever at the pivotal connection.

The closure may be provided with a closure support comprising a lateral projection, and the guiding slide may be provided with a lateral shoulder, the projection engaging below the shoulder when the closure is in the closed position.

This engagement is a security feature especially effective against burglary, when the burglar tries to enter the vehicle through the roof system by forcing the closure upwardly.

The operating system may further comprise a guide mechanism for guiding the closure towards the open position when the rear edge thereof is in the raised position, wherein the guide mechanism includes a stationary guide curve having a rear portion extending substantially parallel to the closure when in closed position, and a front portion extending at an angle to the rear portion in a vertical plane, the stationary guide curve being slidably engaged by a guide member connected to the closure. This stationary guide curve is a reliable means for regulating the transfer between horizontal and vertical movements of the closure.

BRIEF DESCRIPTION OF THE DRAWINGS

Hereinafter aspects of the invention will be elucidated while referring to the drawings, in which:

FIG. 6 is an enlarged perspective view of the part containing the stationary front guide curve portion of the operating mechanism of FIGS. 3 and 4.

FIG. 7 is a perspective view of the part of FIG. 6 turned 180°.

FIG. 8 is an enlarged perspective view of the front lever and auxiliary sliding member of the operating mechanism of FIGS. 3 *and* 4.

FIG. 9 is a perspective view corresponding to that of FIG. 8 but showing only the front lever turned 180°.

FIG. 10 is an enlarged cross-sectional view according to the line X-X in FIG. 3.

FIG. 11 is a perspective exploded view of the parts of a second embodiment of the operating mechanism.

FIG. 12 is a view corresponding to that of FIG. 8, but showing the front lever and sliding member of the second embodiment.

FIG. 13 is a view corresponding to that of FIG. 10 but showing the operating mechanism of the second embodiment.

FIGS. 14-16 are longitudinal sectional views of the operating mechanism of FIG. 11, in three different positions.

DETAILED DESCRIPTION OF THE ILLUSTRATIVE EMBODIMENTS

Figure 1:
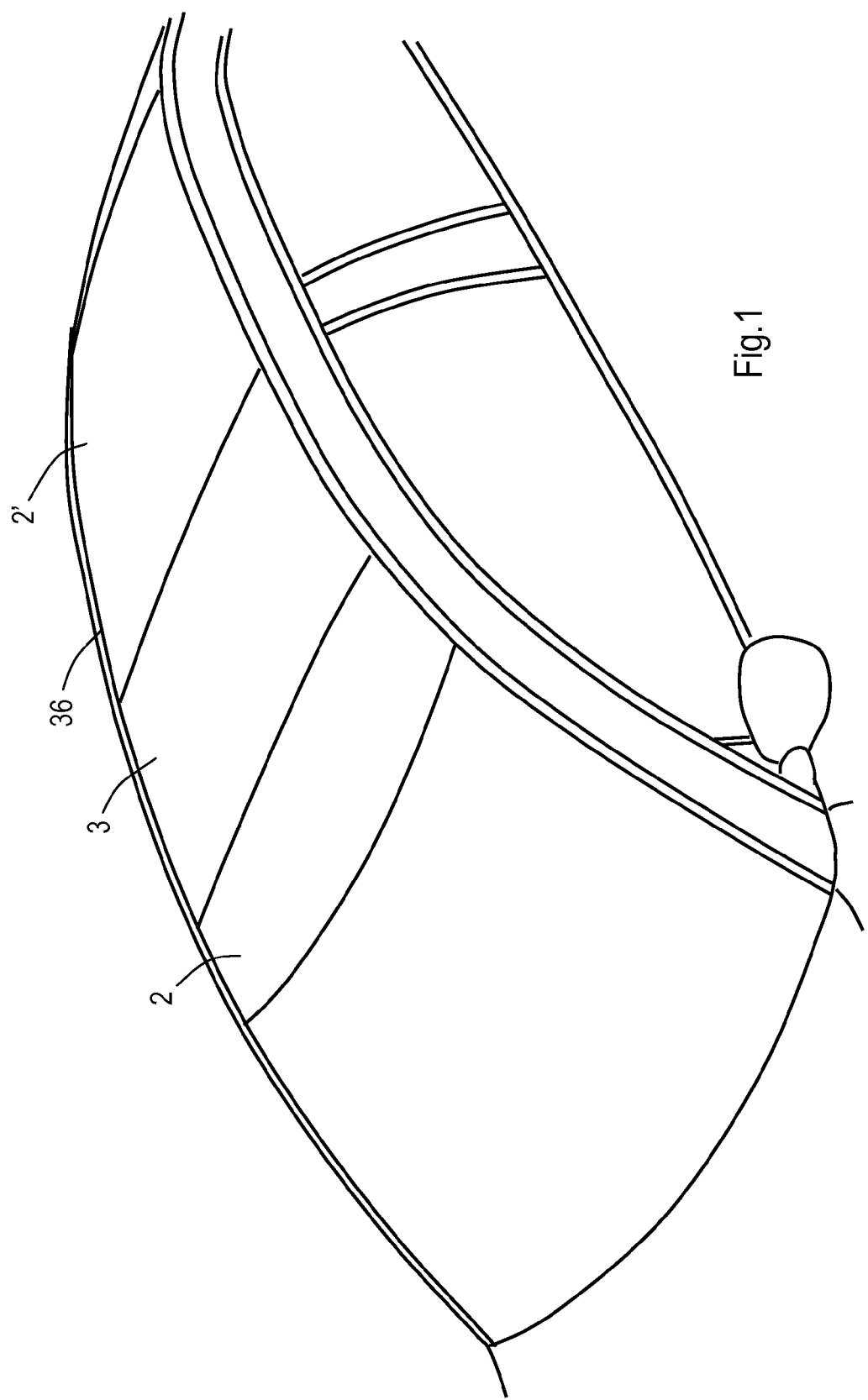
FIG. 1 is a schematic perspective view of a part of a vehicle with an embodiment of the roof system in a closed position.
Figure 2:
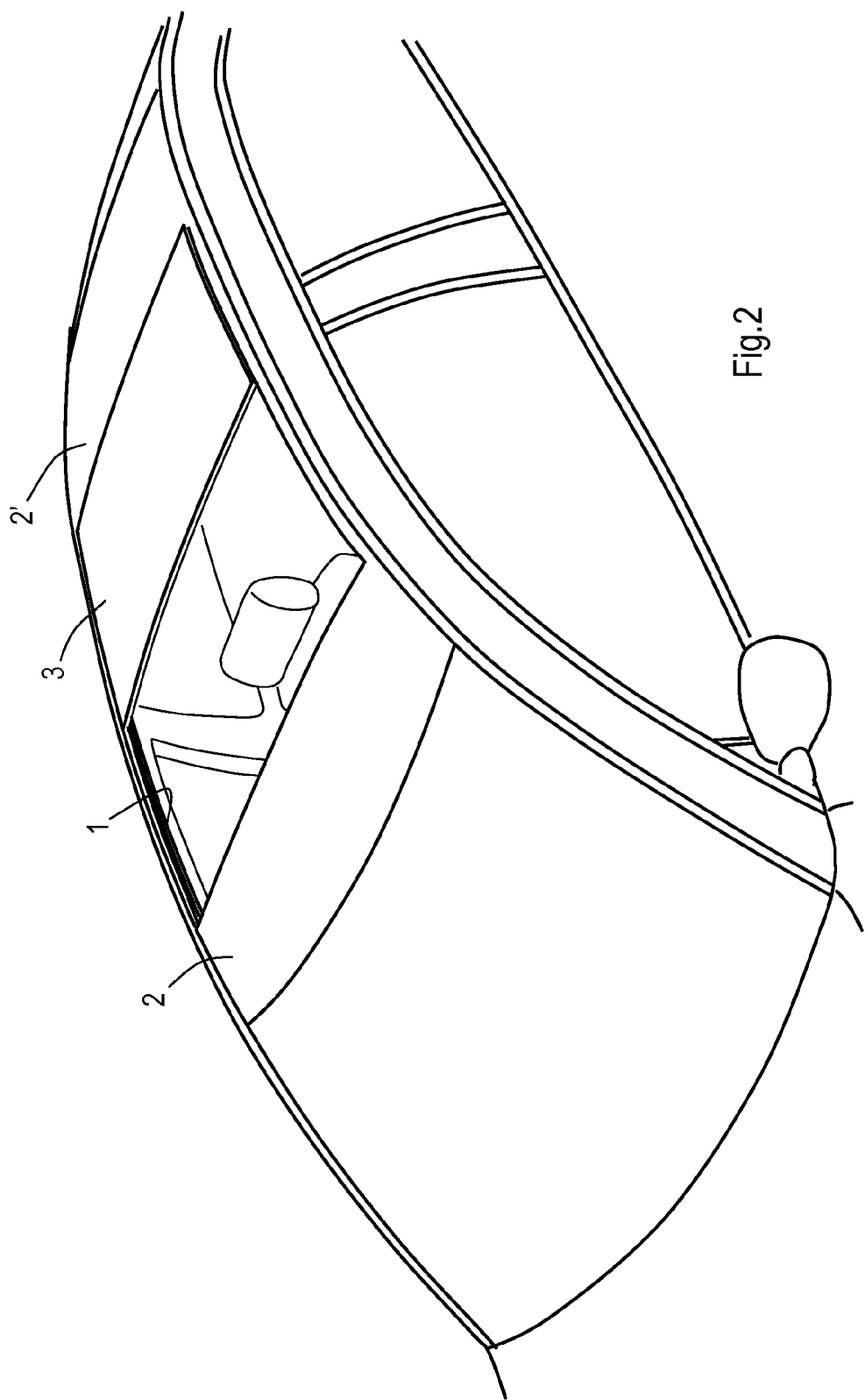
FIG. 2 is a view corresponding to that of FIG. 1 but showing a panel of the roof system in an open position.

FIGS. 1 and 2 show part of a vehicle, in particular an automobile, which comprises a roof opening 1 (FIG. 2) defined in a (stationary) roof part 2. A closure, here in the form of a panel 3, is movable between a closed position (FIG. 1) in which it closes the roof opening 1, and an open position (FIG. 2) in which it opens the roof opening 1 and in which it is positioned at least partially above the roof part 2, here the fixed roof part adjoining the rear of the roof opening.

As is known per se such an roof system (which is also known as a top slider roof) could comprise additional elements, such as for example a tiltable wind deflector positioned ahead of the roof opening 1, or further movable or stationary panels, for example in a position behind the panel 3 when it is in its closed position. In fact, in the present embodiment, the roof part behind the roof opening 3 is formed by a roof panel 2' which may be a stationary roof panel or a movable panel.

The movement of the panel 3 from the closed position as illustrated in FIG. 1 towards an open position as illustrated in FIG. 2 is governed by an operating mechanism, the parts of which have been illustrated in FIGS. 3-10 (first embodiment) and 11-13 (second embodiment) and the operation of which is illustrated schematically in FIGS. 14-16. It is noted that FIGS. 3-16 represent embodiments of an operating mechanism on one longitudinal side of the roof construction, i.e. one longitudinal side of the panel 3, and it should be understood that a corresponding operating mechanism normally will be provided at the opposite longitudinal side, generally in mirror image.

FIGS. 3-10 show the parts of a first embodiment of one of the operating mechanisms. The mechanism is connected to the panel 3 through a closure support, in this case a panel bracket 4 which is fixed to the lower side of the panel 3 near the longitudinal edge thereof in any known manner, for example through encapsulation or through attachment to another encapsulated part. The operating mechanism includes a first or rear device 6 and a second or front device 5.

The second or front device 5 includes a lever 7. This lever 7 comprises a lower pivot axis, here a pivot pin 8, an upper pivotal connection 9, pivotally connecting the lever 7 to the panel bracket 4 of the panel 3, and an intermediate guide connection 10, here in the form of a cam. In the vicinity of the intermediate guide connection 10, but on the other side of the lever 7, i.e. on the side opposite to the parts 8, 9 and 10, there is arranged a guide member 11 in the form of a guide cam. This guide member 11 is adapted to be in sliding engagement with a stationary guide curve 12. As shown in FIG. 7 (and FIGS. 14-16) the stationary guide curve 12 includes a rear portion 12" extending substantially parallel to the guide rail 13 (and panel 3 when in closed position), and a front portion 12' extending substantially at an angle to the rear portion 12". As the guide member 11 has a substantially oval shape, the height of the guide curve 12 varies along its length depending on the orientation of the guide curve 12, but also on the projected orientation of the lever 7 and the variation of this orientation of the lever 7 along the length of the guide curve 12.

Figure 3:
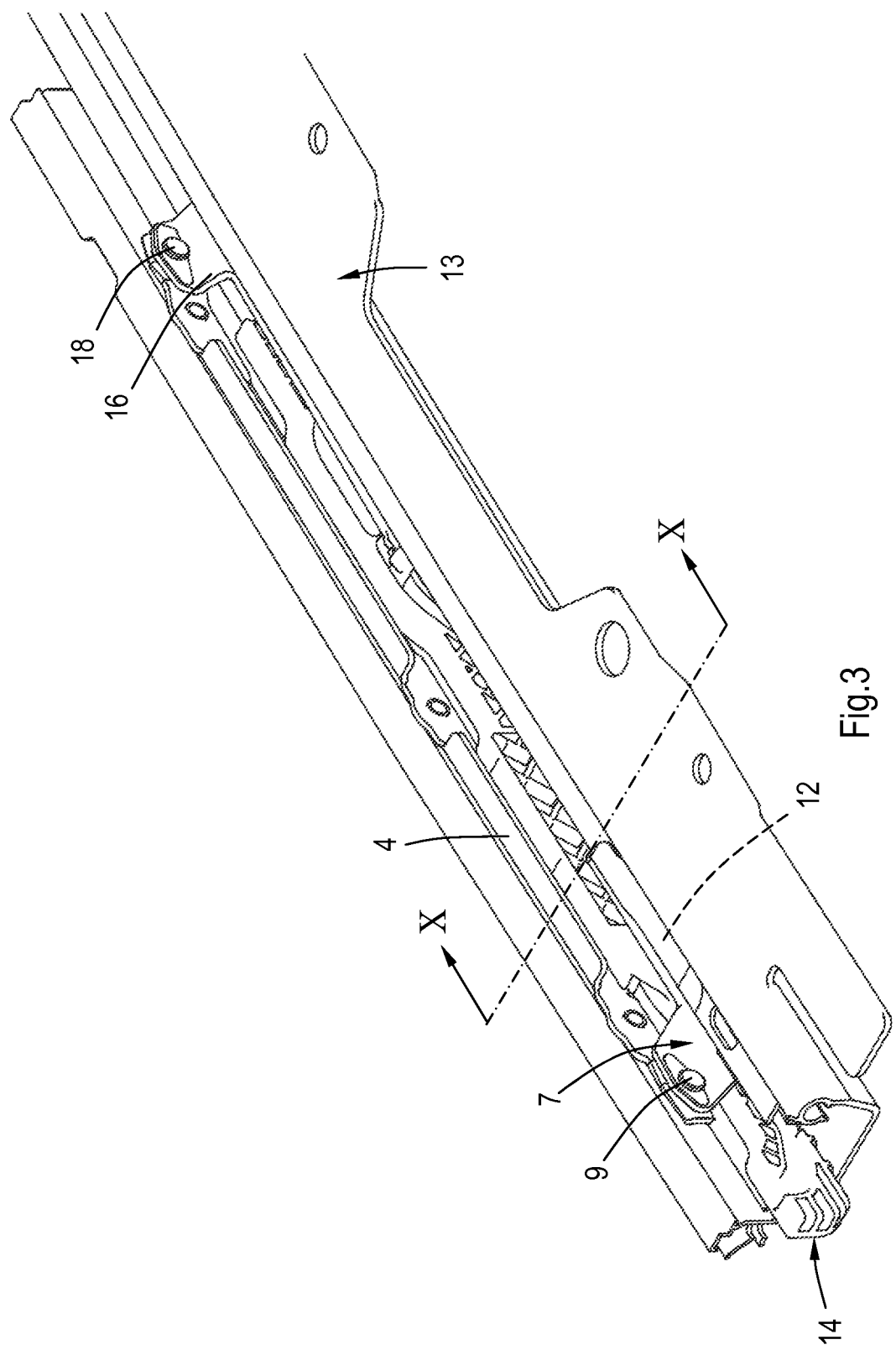
FIG. 3 is an enlarged simplified perspective view of the parts of the operating mechanism of the roof system of FIGS. 1 and 2 mounted in the guide rail.

In FIGS. 3 and 7 it is shown that the front portion 12' of the stationary guide curve 12 is made in a plastic part which is attached to a stationary guide rail 13 which is attached to the vehicle roof, either directly or through a frame. The guide rail 13 extends at least along the roof opening 1 in a longitudinal direction of the vehicle. The main part of the rear portion 12" of the stationary guide curve 12 will generally be formed by flanges 13' of the stationary guide rail 13 (see FIG. 7). The stationary guide curve 12 locks the horizontal movement of the panel 3 when it is in its forward position (through portion 12'), and locks the vertical movements of the panel when the panel 3 is in the rearward position (through portion 12").

The intermediate guide connection 10 co-operates with a guiding slide 14 (FIGS. 4 and 5) which will generally be connected directly to a driving mechanism, for example an electric motor driving a push and pull cable 14' (FIG. 10) and therefore also acts as a driving slide. The guiding slide 14 is slidably guided in the stationary guide rail 13 and determines the movements of the panel 3. The guiding slide 14 includes a front guide curve, here a guide slot, 15 in which the cam of the intermediate guide connection 10 slidably engages. The front guide curve 15 includes a substantially vertical front locking portion 15', a lower front portion 15" and a rear portion 15'" which is open on its lower side so that the cam of the intermediate guide connection 10 projects in the guide rail 14 there. The extent of the front guide curve 15 determines the vertical movements of the front edge of the panel 3.

Figure 4:
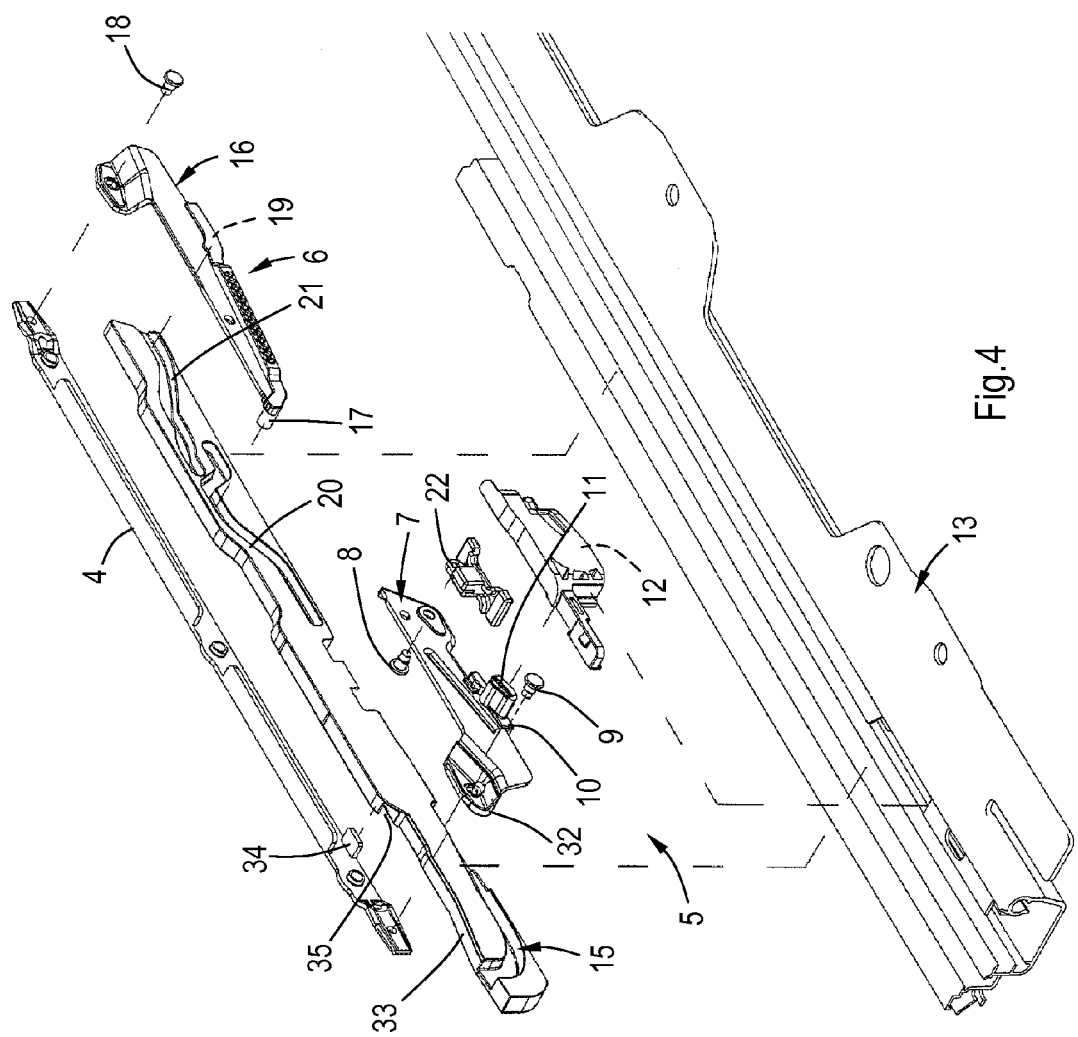
FIG. 4 is an exploded view showing the parts of the operating mechanism of FIG. 3 in perspective view.

The first or rear device 6 of the operating mechanism includes a lever 16 (FIGS. 3 and 4). This lever 16 comprises a lower pivot axis or pivot pin 17, an upper pivotal connection 18 and an intermediate guide connection 19. Both levers 7 and 16 extend in opposite directions, that is the front lever 7 extends from its connection to the panel 3 backwardly and downwardly, whereas the rear lever 16 extends forwardly and downwardly from the panel 3. As a result, both levers can be controlled by the same guiding slide 14 having a relatively short length, whereas the levers 7 and 16 connect to the panel 3 at a position near the front or rear edge respectively. This close connection to the front and rear edge of the panel 3 makes the support of the panel 3 very stable.

Figure 5:
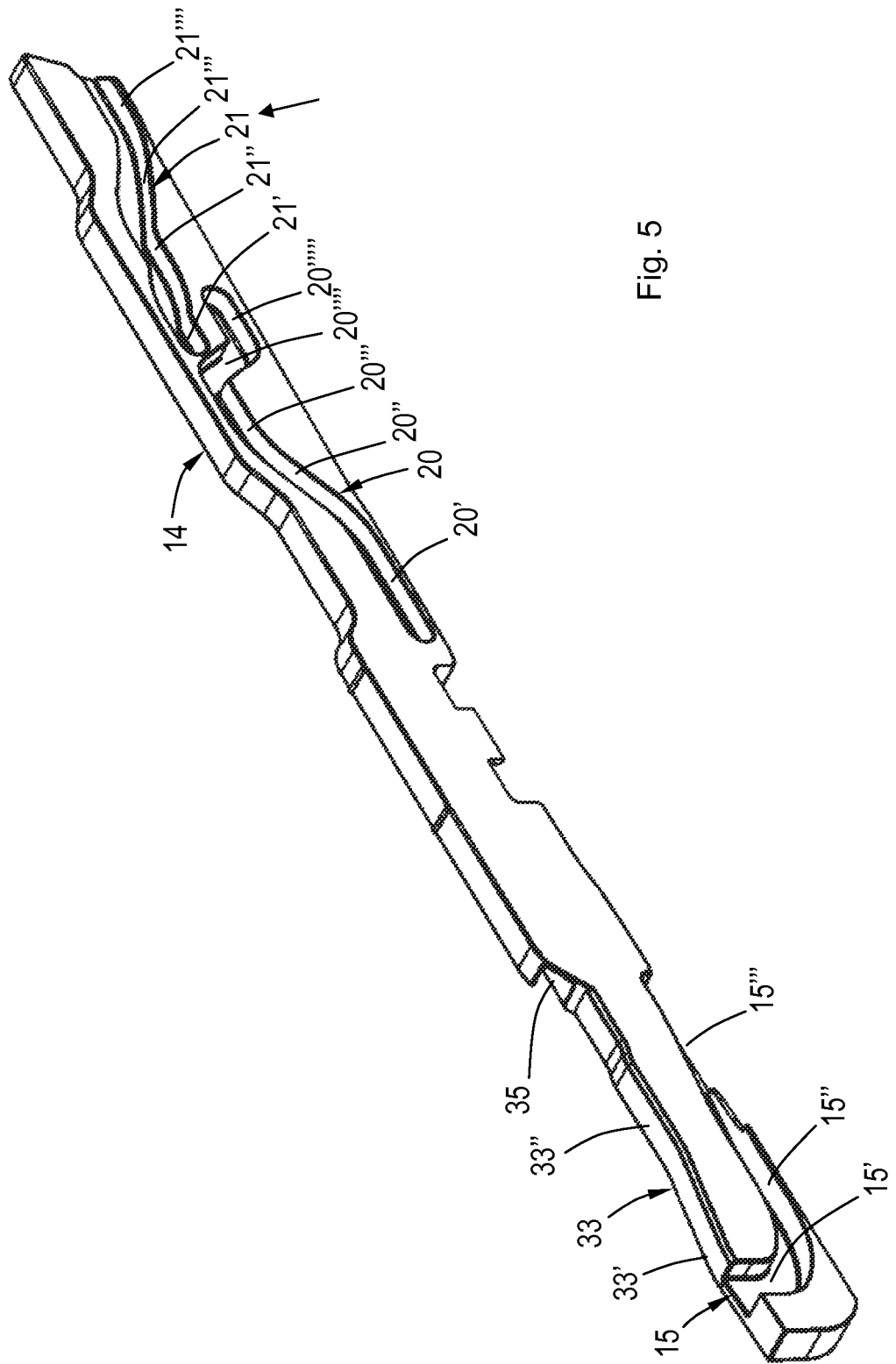
FIG. 5 is a perspective view of the guiding slide of the operating mechanism of FIGS. 3 and 4.

The slidable connection between the rear lever 16 of the first device 6 and the guiding slide 14 is accomplished by the engagement of the pin 17 and of a cam of the intermediate guide connection 19 with a rear guide track. The rear guide track in the embodiment as shown in FIG. 5 includes two separate guide tracks or slots 20, 21, one for the pin 17 and one for the intermediate guide connection 19 as the paths of movement thereof do not overlap. The guide track 20 includes a lower front portion 20', a rearwardly and upwardly inclining portion 20", a high portion 20'", a vertical portion 20"" and a lower rear portion 20""'. The pin 17 slides only in the portions 20', 20" and 20"' during use. The other portions are only used for mounting the rear lever 16 to guiding slide 14. The guide track 21 includes a substantially horizontal front portion 21', a second slightly lower substantially horizontal portion 21", a rearwardly and downwardly inclining portion 21'", and a substantially horizontal rear portion 21"".

The above description more or less describes the operating mechanism according to U.S. Pat. No. 7,828,376, the contents of which are incorporated herein by reference in its entirety. The pivot pin 8 according to the operating mechanism of the present roof system is not engaged with the guiding slide 14, but is supported by a separate auxiliary sliding member 22 (see FIGS. 4, 8 and 10). This sliding member 22 is guided directly in the guide rail 13, that is in a guide channel 23 thereof. The sliding member 22 includes a front and rear slide shoe 24 and 25 and central slide shoes 26 and 27. The front and rear slide shoes 24, 25 support the sliding member 22 at least in vertical downward direction for example on the bottom of the guide channel 23. Between the front and rear slide shoes 24, 25, the sliding member 22 is free from the guide channel 23, at least in vertically downward direction, so that all vertically downward forces on the pivot pin 8 are distributed between the front and rear slide shoes 24, 25 engaging the bottom of the guide channel 23. The central slide shoe 26 is positioned below and spaced from an upper horizontal flange 28 of the guide channel 23, whereas both central slide shoes 26, 27 engage a vertical guide flange 29 of the guide channel 23, each on an opposite surface thereof. The vertical guide flange 29 is suspended from the upper flange 28. The free lower end of this vertical guide flange 29 may be in engagement with the guide shoes 26, 27. Thus, the sliding member 22 is supported by the guide channel 23 in upward and sideward direction close to the pivot pin 8, so that the pivot pin 8 receives a very good support under high loads. The sliding member 22 may be made completely of plastic or may for example be made of a steel body part 30 with the plastic slide shoes 24-27 moulded around this steel part 30, as is shown in FIGS. 8 and 10. Pivot pin 8 is fixed to the steel part 30 of the sliding member 22 and the front lever 7 is provided with a plastic molding 31 acting as a bearing for the lever 7 on the pivot pin 8. This may or may not also provide for a lateral support of the front lever 7, i.e. in axial direction of the pivot pin 8.

FIGS. 4, 8 and 9 show that the front lever 7 comprises near its upper pivotal connection 9 a slide shoe 32 that is guided by the upper side of the guiding slide 14, in particular by an auxiliary guide track 33 (FIGS. 4 and 5) in order to guide and support the lever 7 at least when the cam of the intermediate guide connection 10 is in the open rear slot portion 15'" where thus the cam is not supported in downward direction. A front portion or ramp 33' of the guide track 33 slightly slopes upwardly to the front in order to lift the cam of the intermediate connection 10 from the open rear portion 15'" into the lower front portion 15". There is a small overlap in the take-over between the slide shoe 32 and the intermediate guide connection 10, but if the slide shoe 32 is disengaged from the guide track 33, the intermediate guide connection 10 takes over the control of the front lever 7. A rear portion 33" of the guide track 33 extends substantially parallel to the guide rail 13.

As is shown in FIG. 4, the panel bracket 4 comprises a lateral projection, here a horizontal lip 34, whereas the guiding slide 14 includes a shoulder 35 below which the lip 34 may engage when the panel 3 is in its closed position in order to provide additional security against unwanted upward movements of the panel 3.

FIGS. 11-16 show a second embodiment of the operating mechanism. This operating mechanism is very similar to the first embodiment. Like parts are indicated with like reference numerals. Different in this second embodiment is that the slot of the front guide curve 15 is fully closed, and the front lever 7 does not have a slide shoe 32, and the guiding slide 14 no auxiliary guide track 33.

A further difference is to be seen in the sliding member 22 shown in FIGS. 11-13. This sliding member 22 is made completely of plastic or can have a metal core as in the first embodiment. The sliding member 22 is free from the bottom of the guide channel 23, so that any dirt on this bottom will have no influence on the sliding properties of the sliding member 22. In this embodiment, the vertical downwardly suspended flange 29 of the guide channel 23 has a horizontal portion, here a lower horizontal end part 37 around which slide shoes 38 and 39 of the sliding member 22 engage. Thus, the support of the sliding member 22 in upward direction takes place at a vertical distance from the bottom of the sliding member 22. The longitudinally spaced slide shoes 38 and 39 also engage one of the vertical surfaces of the vertical flange 29, whereas an intermediate slide shoe 40 engages the opposite surface of the vertical flange 29. This provides for a rigid support of the sliding member 22 in lateral direction while it is easier to compensate for tolerances between the surfaces of the slide shoes 38, 39, 40 due to their spacing in longitudinal direction. The plastic pivot pin 8 is formed in one piece with the sliding member 22 and engages into a bushing which is formed directly in the (metal) front lever 7. FIG. 13 also shows a portion of a connecting part 41 which connects the cable 14' with the guiding slide 14 (at another position along the longitudinal length of the guiding slide 14).

The operation of the front side of the operating mechanism of the roof system will be explained mainly with reference to FIGS. 14-16. The operation of the rear lever 16 will be similar as described in U.S. Pat. No. 7,828,376.

In FIG. 14, the operating mechanism is shown with the panel 3 in its closed position. The panel 3 will be pulled forcedly by the operating mechanism with its seals in engagement with the roof part 2, so that no leakage of noise from the environment to the interior of the vehicle will occur. The seals (not shown) may either be fixed to the panel 3 or to the stationary roof part 2, or even to both. In this closed position both levers 7 and 16 of the rear and front devices 6,5 are in their lowest position. This is accomplished by their engagement with the guiding slide 14 which is in its front position in the guide rail 13. In this front position of the guiding slide 14, the intermediate guide connection 10 of the front lever 7 is positioned near the rear end of the rear portion 15''' of the track 15. The guide member 11 of the lever 7 is positioned at the lower end of the front portion 12' of the stationary guide curve 12. This front portion 12' of the stationary guide curve 12 provides a very stable lock against sliding movements of the panel 3 along the stationary guide rail 13. The horizontal lip 34 is hooked below the shoulder 35 on the guiding slide 14. The upper wall of the front guide track 15 keeps the cam of the intermediate guide connection 10 down. Due to the arrangement of this intermediate guide connection 10 near the pivotal connection 9, due to the position of the pivotal connection 9 near the front edge of the panel 3, and due to the additional connection between the panel bracket 4 and the guiding slide 14 there is provided a very stable closed position of the panel at least near the front edge of the panel 3.

In the position of FIG. 15 the guiding slide 14 has been moved over a distance rearwardly, while the panel 3 (represented by bracket 4) is kept substantially in its front position due to the engagement of the guide member 11 with the front locking portion 12' of the stationary guide curve 12 preventing a sliding movement of the panel bracket 4. However, the guide member 11 has been moved slightly upwardly in this vertical front portion 12' due to the movement of the intermediate guide connection 10 through the portion 15'' of the guide curve 15. As the front locking portion 12' starts upwardly and forwardly, the guide member 11 moves slightly to the front when it starts to travel through this front portion 12' and as a result, the panel bracket 4 and panel 3 are slightly moved to the front when the panel 3 is tilted. This compensates for the movement of the panel front during the tilting motion of the panel 3 (which movement is downwardly and rearwardly), so that the seal (not shown) between the stationary roof part 2 and the panel front edge is maintained.

As mentioned, the intermediate connection 10 is moved into the slightly inclined portion 15'' of the track 15. During these movements of the lever 7, the lower pivot pin 8 remains at a constant height, but is free to move longitudinally if necessary to allow movements of the lever 7.

FIG. 16 shows a further position of the bracket 4 and operating mechanism, corresponding to the front edge of the panel 3 having been lifted upwardly and a portion of the panel 3 having been slid rearwardly over the adjacent roof part 2'. The sliding movement of the panel 3 has been made possible by the arrival of the guide member 11 in the rearwardly extending portion of the stationary guide curve 12. This has been accomplished by the upward tilting movement of the lever 7 due to the entry of the intermediate guide connection 10 into the vertical front locking portion 15' of the front guide track 15 in the guiding slide 14. The levers 7 and 16 and therefore the panel 3 are now locked in sliding direction with respect to the guiding slide 14. The intermediate guide connection 10 is kept in its position in the front locking portion 15' due to the engagement of the guide member 11 with the rear portion 12'' of the stationary guide curve 12 preventing a vertical movement of the lever 7. Thus, in the position of FIG. 16, the panel 3 and the operating mechanism move as a unit. The roof panel 2' rearwardly of the roof opening 1 is bordered at its longitudinal sides by a slot 36, so that the guiding slide 14 may be slid far rearwardly below the stationary roof part 2, whereas the panel 3 may move over this roof part 2, because the rear lever 16 or even also the front lever 7 may project through this slot 36 above the guide rail 13. Normally, the slot is closed by a sealing arrangement, but the sealing arrangement is deformable so that the lever(s) may move through the slot 36 by pushing the seals of the sealing arrangement locally to the side. In this manner the operating mechanism connect the parts below the stationary roof part 2 to parts above the stationary roof part 2. This enables the operating mechanism to be moved far backwardly so as to create a large roof opening passage.

The features of the operating mechanism herein described can provide increased stability, while maintaining a low package height. Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A roof system for a vehicle having a roof opening in a roof part thereof, comprising:

at least a closure which is movable between a closed position in which the closure is configured to close the roof opening and an open position in which the closure is configured to open the roof opening and is positioned at least partially above an adjoining roof part;

a pair of stationary guide rails laterally spaced apart from each other, and each configured to slidably guide an operating mechanism that operates the closure in a longitudinal direction of the vehicle, each operating mechanism comprising:

a first device including a first lever configured to move a rear edge of the closure towards a raised position relative to the closed position and above the adjoining roof part;

a second device including a second lever configured to move a front edge of the closure in a vertical direction; and a guiding slide which is slidably accommodated in the guide rail and operably coupled to the first device and the second device so as to move the closure both in vertical and in horizontal directions through the first and second devices;

a sliding member configured to slide in a longitudinal direction of the guide rail;

wherein said first and second levers are spaced and each have, at a first end, a first pivotal connection to the closure, and, remote from the first end, spaced second and third connections at least one of which slidably connecting each respective lever at least to the guiding slide and configured to control movement of said respective lever; and wherein at least one of said first and second levers is pivotally connected to the sliding member at one of said second and third connections, said sliding member being separate from the guiding slide and being laterally supported by the guide rail in directions laterally perpendicular to the longitudinal direction of the guide rails.

2. The roof system according to claim 1, wherein the second connection is positioned near the second end of one of said first and second levers and the third connection is positioned between said first and second connections.

3. The roof system according to claim 1, wherein the at least one of said first and second levers is connected to the sliding member at the second connection.

4. The roof system according to claim 1, wherein the second lever is connected to said sliding member.

5. The roof system according to claim 1, wherein the sliding member is guided in a guide channel of the guide rail, which is provided with a guide flange engaging the sliding member near the respective second connection.

6. The roof system according to claim 5, wherein the guide flange has a horizontal portion engaged by the sliding member spaced from the sides and bottom of the sliding member.

7. The roof system according to claim 5, wherein the guide flange has a downwardly suspended flange portion which is engaged by the sliding member from both sides.

8. The roof system according to claim 7, wherein the downwardly suspended flange portion is spaced from the said both sides of the sliding member.

9. The roof system according to claim 1, wherein the sliding member, when seen in a longitudinal direction of the guide rail, is supported in downward and in upward directions at spaced locations.

10. The roof system according to claim 1, wherein the at least one of said first and second levers is connected to the guiding slide at the third connection, which includes a pin on said at least one of said first and second levers and a track in the guiding slide.

11. The roof system according to claim 10, wherein the track in the guiding slide is a slot which has a downwardly open slot portion which is open at its bottom for a longitudinal extent which is larger than a longitudinal dimension of a cam on at least one of said first and second levers, wherein the guiding slide on its upper side comprises an auxiliary guide track engaged by at least one of said first and second levers at least when the cam is in the open slot portion.

12. The roof system according to claim 11, wherein the auxiliary guide track includes a ramp portion configured to lift said at least one of said first and second levers when the cam is transferred from a downwardly open slot portion to a downwardly closed slot portion in the guiding slide.

13. The roof system according to claim 11, wherein said at least one of said first and second levers engages the auxiliary guide track on the guiding slide at a position near the first end.

14. The roof system according to claim 1, wherein the pivotal connection between the at least one of said levers and the sliding member includes a pin and bearing.

15. The roof system according to claim 1, further comprising a guide mechanism for guiding the closure towards the open position when a rear edge thereof is in the raised position, wherein the guide mechanism includes a stationary guide curve having a rear portion extending substantially parallel to the closure when the closure is in closed position, and a front portion extending at an angle to the rear portion in a vertical plane, the stationary guide curve being slidably engaged by a guide member connected to the closure.

16. The roof system according to claim 1, wherein the closure is provided with a closure support comprising a lateral projection, and wherein the guiding slide is provided with a lateral shoulder, the lateral projection engaging below the lateral shoulder when the closure is in the closed position.

17. The roof system according to claim 1, wherein the guide rail comprises a guide channel having a bottom, the sliding member being guided in the guide channel at a distance from the bottom, such that the sliding member is free from the bottom of the guide channel.

18. A roof system for a vehicle having a roof opening in a roof part thereof, comprising:
a closure configured to close the roof opening;
a pair of guide rails laterally spaced apart from each other;
a pair of operating mechanisms, each operating mechanism moveable on one of the guide rails, each operating mechanism coupled to the closure to move the closure between a closed position herein defined as when the closure closes the roof opening and an open position herein defined as when the closure opens the roof opening at least partially, each of said operating mechanisms comprising:
a first device including a first lever configured to move a rear edge of the closure towards a raised position relative to the closed position;
a second device including a second lever configured to move a front edge of the closure in a vertical direction; and
a guiding slide which is slidably accommodated in the corresponding guide rail and operably coupled to the first device and the second device so as to move the closure both in vertical and in horizontal directions through the first and second devices;
a sliding member configured to slide in a longitudinal direction of the guide rail;
wherein said first and second levers have at a first end, a first pivotal connection to the closure, and, remote from the first end, spaced second and third connections at least one of which connecting said levers at least to the guiding slide; and
wherein at least one of said first and second levers is pivotally connected to the sliding member at one of said second and third connections, said sliding member being separate from the guiding slide and being supported by the guide rail in all directions perpendicularly to the longitudinal direction of the guide rail.

19. The roof system according to claim 18, wherein the second connection is positioned near the second end of one of said first and second levers and the third connection is positioned between said first and second connections.

20. The roof system according to claim 18, wherein the at least one of said first and second levers is connected to the sliding member at the second connection.

21. The roof system according to claim 18, wherein the second lever is connected to said sliding member.

22. The roof system according to claim 18, wherein the sliding member is guided in a guide channel of the guide rail, which is provided with a guide flange engaging the sliding member near the respective second connection.

23. The roof system according to claim 18, wherein the sliding member, when seen in a longitudinal direction of the guide rail, is supported in downward and in upward directions at spaced locations.

24. The roof system according to claim 18, wherein the at least one of said first and second levers is connected to the guiding slide at the third connection, which includes a pin on said at least one of said first and second levers and a track in the guiding slide.

25. The roof system according to claim 18, further comprising a guide mechanism for guiding the closure towards the open position when a rear edge thereof is in the raised position, wherein the guide mechanism includes a stationary guide curve having a rear portion extending substantially parallel to the closure when the closure is in closed position, and a front portion extending at an angle to the rear portion in a vertical plane, the stationary guide curve being slidably engaged by a guide member connected to the closure.

26. A roof system or a vehicle having a roof opening in a roof part thereof, comprising:
- at least a closure which is movable between a closed position in which the closure is configured to close the roof opening and an open position in which the closure is configured to open the roof opening and is positioned at least partially above an adjoining roof part;
- a pair of stationary guide rails laterally spaced apart from each other, and each configured to slidably guide an operating mechanism that operates the closure in a longitudinal direction of the vehicle, each operating mechanism comprising:
  - a first device including a first lever configured to move a rear edge of the closure towards a raised position relative to the closed position;
  - a second device including a second lever configured to move a front edge of the closure in a vertical direction; and
  - a guiding slide which is slidably accommodated in the corresponding guide rail and operably coupled to the first device and the second device so as to move the closure both in vertical and in horizontal directions through the first and second devices;
  - a sliding member configured to slide in a longitudinal direction of the guide rail;
- wherein at least one of said first and second levers has, at a first end, a first pivotal connection to the closure, and, remote from the first end, spaced second and third connections at least one of which connecting said lever at least to the guiding slide;
- wherein at least one of said first and second levers is pivotally connected to the sliding member at one of said second and third connections, said sliding member being separate from the guiding slide and being supported by the guide rail in directions perpendicularly to the longitudinal direction of the guide rail; and
- wherein the closure is provided with a closure support comprising a lateral projection, and wherein the guiding slide is provided with a lateral shoulder, the lateral projection engaging below the lateral shoulder when the closure is in the closed position.

27. A roof system or a vehicle having a roof opening in a roof part thereof, comprising:
- at least a closure which is movable between a closed position in which the closure is configured to close the roof opening and an open position in which the closure is configured to open the roof opening and is positioned at least partially above an adjoining roof part;
- a pair of stationary guide rails laterally spaced apart from each other, and each configured to slidably guide an operating mechanism that operates the closure in a longitudinal direction of the vehicle, each operating mechanism comprising:
  - a first device including a first lever configured to move a rear edge of the closure towards a raised position relative to the closed position;
  - a second device including a second lever configured to move a front edge of the closure in a vertical direction; and
  - a guiding slide which is slidably accommodated in the corresponding guide rail and operably coupled to the first device and the second device so as to move the closure both in vertical and in horizontal directions through the first and second devices;
  - a sliding member configured to slide in a longitudinal direction of the guide rail;
- wherein at least one of said first and second levers has, at a first end, a first pivotal connection to the closure, and, remote from the first end, spaced second and third connections at least one of which connecting said lever at least to the guiding slide;
- wherein at least one of said first and second levers is pivotally connected to the sliding member at one of said second and third connections, said sliding member being separate from the guiding slide and being supported by the guide rail in directions perpendicularly to the longitudinal direction of the guide rail; and
- wherein the guide rail comprises a guide channel having a bottom, the sliding member being guided in the guide channel at a distance from the bottom, such that the sliding member is free from the bottom of the guide channel.

* * * * *